(12) United States Patent
Nejad

(10) Patent No.: US 12,449,255 B2
(45) Date of Patent: Oct. 21, 2025

(54) REAL TIME FAULT DETECTION OF GYROSCOPE ELECTRONIC CIRCUITS

(71) Applicant: Panasonic Intellectual Property Management Co., Ltd., Kadoma (JP)

(72) Inventor: Mohammad Maymandi Nejad, Hopkinton, MA (US)

(73) Assignee: Panasonic Intellectual Property Management Co., Ltd., Kadoma (JP)

( * ) Notice: Subject to any disclaimer, the term of this patent is extended or adjusted under 35 U.S.C. 154(b) by 393 days.

(21) Appl. No.: 18/309,914

(22) Filed: May 1, 2023

(65) Prior Publication Data

US 2024/0369363 A1 Nov. 7, 2024

(51) Int. Cl.
*G01C 19/5776* (2012.01)
(52) U.S. Cl.
CPC ................. *G01C 19/5776* (2013.01)
(58) Field of Classification Search
CPC ................................. G01C 19/5776
USPC ....................................... 375/319
See application file for complete search history.

(56) References Cited

U.S. PATENT DOCUMENTS 10,837,796 B2  11/2020  Painter et al.

FOREIGN PATENT DOCUMENTS

EP          3702730 A1 *   9/2020   ........... G01C 25/005

* cited by examiner

*Primary Examiner* — Dominic D Saltarelli
(74) *Attorney, Agent, or Firm* — McDonald Hopkins LLC

(57) ABSTRACT

A gyro sensor circuit includes a gyro sensor generating a radio frequency (RF) sensing signal according to an angular movement of the gyro sensor, and an RF sensing path comprising a first chopper comprising a chopping switch, and configured to chop a tone signal at a chopping frequency to generate a chopped tone signal, an adder configured to insert the chopped tone signal to the RF sensing signal to produce a combined RF sensing and tone signal, and a first demodulator configured to mix the combined RF sensing and tone signal with a local oscillator (LO) signal to output a demodulated signal. The tone signal may be the LO signal. The gyro sensor circuit further comprises a sense base band path comprising a first analog-to-digital converter configured to sample the demodulated signal to output a digitized signal, and a first digital signal processor to extract various signals to be analyzed.

20 Claims, 2 Drawing Sheets

REAL TIME FAULT DETECTION OF GYROSCOPE ELECTRONIC CIRCUITS

TECHNICAL FIELD

The present disclosure relates to real time fault detection systems and methods for electronic circuits. In particular, the present disclosure provides methods and apparatuses for continuously monitoring of gyro sensor circuits with various paths, such as a forced-to-rebalance (FTR) feedback path, RF and base band sense paths, a quadrature cancellation loop (QCL) path as well as a drive loop, for their functionality and accuracy. Also, the methods and apparatuses are capable of identifying components of which path function abnormally when deviations from normal conditions occur.

BACKGROUND

Gyroscope sensors often employ various loops to remove the sensitivity of the system gain and linearity to the gyroscope gain, quality factor (Q), and linearity, and to extend the system's bandwidth beyond that of the open loop gyroscope. With the closed loops, the feedback electronics control the end-to-end gain and linearity much better than an open loop sensing architecture.

The sensitivity of gyroscopes is normally calibrated by the gyroscope supplier using a known sequence of rotary stimuli. The sensitivity, however, is dependent on a number of electromechanical properties that are strain sensitive and/or change over the life of the gyroscope. As a result, the sensitivity shifts after installation of the gyroscope into the end-user's system or drifts over the life of the gyroscope. Because the true input stimuli into the gyroscope after installation are not observable, it is difficult to conveniently recalibrate the sensitivity of the gyroscope when the gyroscope is deployed in the field.

While these closed loops have the advantage of including the gyroscope in the system monitoring, it has inaccuracies or false alarm problems if the performance of the electronic circuit driving the gyro sensor deteriorate over time. Hence, there is a need for the technique for continuous monitoring without being affected by external mechanical or electrical disturbances to the gyroscope sensor.

SUMMARY

One object of this disclosure is to provide real time fault detection systems and methods for continuously monitoring the electronic components with various paths including a RF sense path, a sense base band (SBB) path, a FTR loop and/or a QCL path for their functionality and accuracy, to ensure high performance of a gyro sensor circuit.

In one aspect, a gyro sensor circuit includes a gyro sensor generating a radio frequency (RF) sensing signal according to an angular movement of the gyro sensor, and an RF sensing (RFS) path comprising a first chopper comprising a chopping switch, and configured to chop a tone signal at a chopping frequency to generate a chopped tone signal, an adder configured to insert the chopped tone signal to the RF sensing signal to produce a combined RF sensing and tone signal, a first RF amplifier to amplify the combined signal, and a first demodulator configured to mix the combined RF sensing and tone signal with a local oscillator (LO) signal to output a demodulated signal.

In one embodiment, the tone signal is the LO signal.

The gyro sensor circuit may further comprise a sense base band path comprising a first analog-to-digital converter (ADC) configured to sample the demodulated signal to output a digitized signal, and a first digital signal processor (DSP) to extract a signal at chopping frequency from the digitalized signal, compare an amplitude of the extracted signal with a target range that is determined based on gains of components in the drive path and the RFS path and an amplitude of the inserted tone signal, and turn on a sense base band (SBB) safety measure (SM) flag when the amplitude of the extracted signal deviates from the target range determined for the SBB path.

The SBB path may further comprise a second amplifier configured to amplify the demodulated signal.

The first DSP may comprise a rate extraction circuit configured to extract a rate signal of the gyro sensor from the digitalized signal, the rate signal indicating an angular velocity measured by the gyro sensor.

The gyro sensor circuit may further comprise a feedback path configured to feed back a portion of the demodulated signal to the gyro sensor as a feedback signal, the feedback path comprising a third amplifier configured to amplify the feedback signal to produce a first amplified feedback signal, a modulator to upconvert the feedback signal to the resonant frequency of the gyro sensor (f_res), and a test voltage monitor configured to extract the signal component at the chopping frequency from the upconverted feedback signal, compare a voltage of the extracted component with a target range determined based on gains of elements of the feedback path and RFS path, and turn on a forced to rebalance (FTR) safety measure (SM) flag when the amplitude of the extracted signal deviates out of the target range determined for the feedback path.

The test voltage monitor may comprise a demodulator and a band pass filter configured to extract the signal component corresponding to the injected tone signal.

The gyro sensor circuit may further comprise a quadrature cancellation loop (QCL) path for a misalignment in the gyro sensor, the QCL path comprising a phase shifter configured to shift a phase of the RF combined signal by 90 degrees to produce a shifted signal, a second demodulator configured to mix the shifted signal and LO signal supplied from LO signal input to generate a second demodulated signal, a second ADC configured to digitize the amplified signal to produce a second digitalized signal, a second DSP compromising a digital low pass filter configured to extract a DC component from the second digitalized signal as a quadrature signal indicating an amount of a misalignment occurred in the gyro sensor, a digital band pass filter to extract the signal component at the chopping frequency and compare the amplitude of the extracted signal with a target range that is determined based on gains of components in RFS path and QCL path, and turn on a QCL SM flag when the amplitude of the extracted signal deviates out of target range determined for the QCL path; otherwise, turn off the QCL SM flag.

In another aspect, an electronic system coupled with the gyro sensor circuit, wherein the electronic system is configured to, when at least one SM flag turns off and remaining SM flags turn on, determine that components of the RFS path operate normally, and components of a non-common path with an SM flag off functions normally, and components of a non-common path with an SM flag on functions abnormally.

When FTR SM flag is off, SBB SM flag on, and QCL flag off, the electronic system may be configured to determine that the components of RFS path 2 are operating normally, and the components of FTR feedback path 20 are operating normally, and one or more of the components of sense base band path 10 are in malfunction, and the components of QCL path function normally.

When FTR SM flag is off, SBB SM flag on, and QCL flag on, the electronic system may be configured to determine that the components of RFS path 2 operate normally, and one or more of the components of sense base band (SBB) path 10 are in malfunction, and one or more of the components of QCL path are in malfunction.

When FTR SM flag is off, SBB SM flag off, and QCL flag on, the electronic system is configured to determine that the components of RFS path operate normally, and the components of the FTR path operate normally, and only one or more of the components of QCL path are in malfunction.

In another aspect, a method for operating a gyro sensor circuit comprising a gyro sensor generating a radio frequency (RF) sensing signal according to an angular movement of the gyro sensor, and an RFS path configured to process the RF sensing signal, the method comprising chopping a tone signal at a chopping frequency to generate a chopped tone signal, inserting the chopped tone signal to the RFS path to produce a combined RF sensing and tone signal, a demodulator coupled with a local oscillator (LO) generating a LO signal, and demodulating the combined RF sensing and tone signal with a local oscillator (LO) signal to output a demodulated signal.

In one embodiment, the gyro sensor circuit comprises a sense base band path for processing the RF sensing signal, wherein the method further comprises digitizing, by an analog-to-digital converter (ADC), the demodulated signal to output a digitized signal, extracting, by a digital signal processor (DSP), a signal at the chopping frequency from the digitalized signal, comparing an amplitude of the extracted signal with a target range that is determined based on gains of components in the drive path and the RFS path and an amplitude of the inserted tone signal, and turning on SBB SM flag when the amplitude of the extracted signal deviates out of the target range determined for SBB path.

The gyro sensor circuit may comprise a feedback path for feeding back a portion of the demodulated signal toward the gyro sensor as a feedback signal, wherein the method may amplify the first feedback signal to produce a first amplified feedback signal, modulating it to the resonant frequency (f_res) of the gyro and then applied to the gyro electrodes. The amplitude of the test tone signal is extracted in the SM circuit, comparing the voltage of the extracted component with a target range determined based on gains of elements of the feedback path and RFS path, and turning on a force to rebalance (FTR) safety measure (SM) flag when the amplitude of the extracted signal deviates out of the target range determined for the feedback path.

The method may further comprise shifting a phase of the combined RF signal to produce a shifted signal, mixing the shifted signal with an LO signal supplied from LO signal input to generate a second demodulated signal, digitizing the amplified signal to produce a digitalized signal, extracting a DC component from the digitalized signal as a quadrature signal indicating an amount of misalignment in the gyro sensor, and extracting the test tone amplitude by passing the demodulated signal through a bandpass filter (BPF) and comparing the amplitude of the extracted signal with a target range that is determined based on gains of components in RFS path and QCL path, and turning on a QCL SM flag when the amplitude of the extracted signal deviates out of the target range determined for the QCL path; otherwise, turn off the QCL SM flag.

The method may further comprise, when at least one SM flag turns off and the other SM flags turn on, determining that the RFS path functions normally, and at least one component of a path with an SM flag OFF, among SBB path, FTR feedback path, and QCL path, functions normally, and at least one component of a path with an SM flag on functions abnormally.

The method may further comprise, when at least one SM flag turns on and the other SM flags turn off, determining that the RF sensing path functions normally, and components of a path with an SM flag off, among the SBB path, FTR feedback path, and QCL path, function normally, and at least one component of a path with an SM flag on functions abnormally.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, coupled to or with, be communicable with, cooperate with, interleave, juxtapose, be proximate to, be bound to or in with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
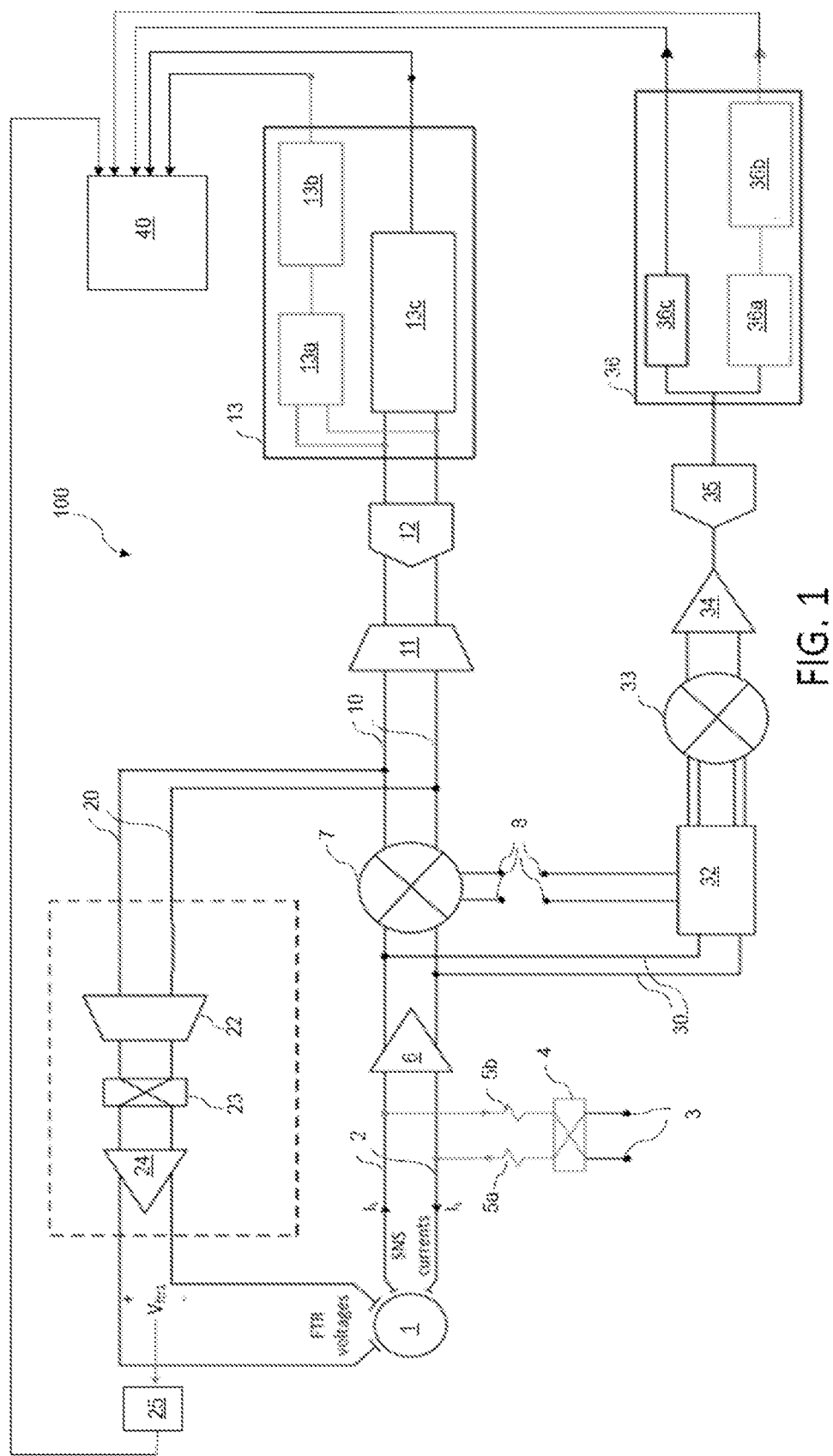
FIG. 1 illustrates a gyroscope sensor circuit for monitoring components in a radio frequency (RF) sensing (RFS) path, an FTR feedback path, a sense base band (SBB) path, and a QCL path, according to one embodiment of the present disclosure.
Figure 2:
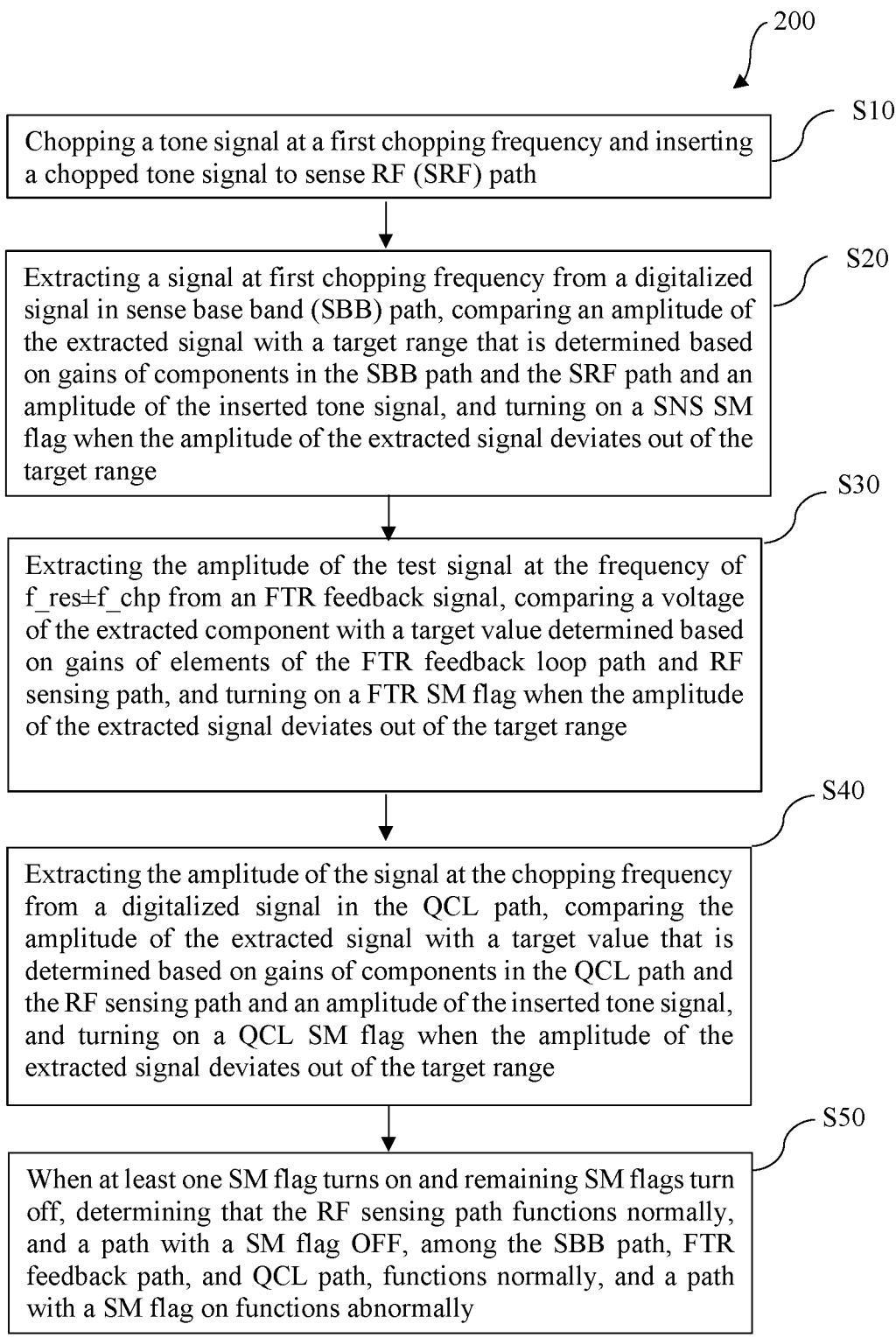
FIG. 2 illustrates an example of a method for monitoring the components in various paths, and identifying the components of a path that function abnormally.

FIGS. 1 and 2, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method. The following description with reference to the accompanying drawings is provided to assist in a comprehensive understanding of various embodiments of the present disclosure as defined by the claims and their equivalents. It includes various specific details to assist in that understanding but these are to be regarded as mere examples. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

It should be apparent to those skilled in the art that the following description of various embodiments of the present disclosure is provided for illustration purposes only and not for the purpose of limiting the present disclosure as defined by the appended claims and their equivalents.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or a combination thereof, but do not preclude the presence or addition of one or more other features, numbers, steps, operations, components, elements, or combinations thereof.

FIG. 1 illustrates the schematic block diagram of gyroscope sensor circuit 100 with the single tone safety mechanism architecture for locating a faulty component(s), according to one embodiment of the present disclosure. The single tone safety mechanism architecture allows detecting an occurrence of any malfunctions in gyroscope sensor circuit 100 and identifying which components of gyroscope sensor circuit 100 cause such malfunctions.

In the single tone safety mechanism architecture, a known tone signal is injected into the gyroscope sensor circuit 100 and its associated signals are measured at several points in forced-to-rebalance (FTR) path 20, quadrature cancellation loop (QCL) path 30, as well as sense base band (SBB) path 10.

Gyroscope sensor circuit 100 comprises gyro sensor 1 and RFS path 2 for processing RF sensing signals generated from gyro sensor 1. Electric circuit 100 further includes sense base band (SBB) path 10, FTR feedback path 20, and QCL path 30.

Initially, when gyro sensor 1 moves with angular velocities in different directions, gyro sensor 1 generates RF signals according to the angular movements. Then, the generated RF signals are received by RFS path 2.

In RFS path 2, LO signal input terminal 3 provides a LO signal to first chopper 4 as a test tone signal to be inserted. Chopper 4 chops the tone signal at a chopping frequency (f_chp) and provides the chopped LO signal via resistors 5a, 5b to RFS path 2, in which the chopped tone signal and the RF signal are combined into a combination signal. In one embodiment, the frequency of the test tone may be an operating frequency of gyro sensor 1, for example, 5 MHz and the chopping frequency f_chp is at a lower frequency than the operating frequency, for example 20 KHz.

In another embodiment, the test tone signal may be injected by other means, like current sources, instead of resistors.

First amplifier 6 amplifies the combination signal and provides the amplified signal to demodulator 7. Subsequently, demodulator 7 demodulates the amplified combination signal by multiplying the combination signals and a LO signal supplied from LO signal input 8 to produce a demodulated signal.

Back to RFS path 2, the demodulated combination signal at the output of the demodulator 7 also goes through sense base band (SBB) path 10.

Sense base band path 10 may further comprise second amplifier 11 configured to amplify the combined signal, and a first analog-to-digital converter (ADC) 12 configured to digitize the combined signal for further digital processing. First ADC 12 may be implemented with known converter circuits which generate the digital approximation of the analog signals being sampled at a certain sampling frequency.

The SBB path 10 may also include a first digital signal processor (DSP) 13 to analyze the digitized signal. In this embodiment, first DSP 13 includes bandpass filter 13a to extract a signal at the frequency f_chp, which correspond to the demodulated tone signal, and digital comparator 13b to compare the amplitude of the extracted tone signal with a target range that is determined based on the gains of the components in SBB path 10 and RFS path 2 and the original amplitude of the inserted tone signal. Thus, digital comparator 13b can continuously monitor the components of RFS path 2 and SBB path 10 to determine if their excessive performance deviates from their target range in RF sense and SBB paths 2 and 10.

Once an excessive deviation out of the target range for RF sensing and/or SBB paths 2 and 10 is detected, digital comparator 13b outputs an SBB SM flag alert ("SBB SM flag ON") to the electronic system 40 that is coupled with gyroscope sensor circuit 100. Otherwise, the SBB SM flag maintains OFF.

By detecting SBB SM flag ON, electronic system 40 can diagnose that one or more components in RFS path 2 and/or SBB path 10 function abnormally. When the SBB SM flag maintains off ("SBB SM flag OFF"), electronic system 40 determines that all components in the RFS path 2 and SBB path 10 function in normal. In one embodiment, electronic system 40 includes a central processing unit (CPU), a read only memory (ROM), a random access memory (RAM), an input/output interface, and a storage device. Alternatively, the electronic system 40 can be implemented by an ASIC circuit or implemented in a computing device like a personal computer (PC).

First DSP 13 may include backend calibration and rate extraction circuit 13c to calibrate and extract a rate signal of gyro sensor 1 from the digitalized signal, the rate signal indicating an angular velocity measured by gyro sensor 1. Backend calibration and rate extraction circuit 13c can comprise a lowpass filter to pass the demodulated RF sense signal of gyro sensor 1 which indicates the rate signal of the gyro.

As shown in FIG. 1, FTR feedback path 20 is branched off from RFS path 2 at the output of demodulator 7.

FTR feedback path 20 may include third amplifier 22, modulator 23 and fourth amplifier 24, and test voltage detection and monitor 25. In one embodiment, third amplifier 22 is a transconductance amplifier (i.e., a gm-cell), and fourth amplifier 24 is a transimpedance amplifier (TIA).

In FTR feedback path 20, the demodulated signal is fed to third amplifier 22 for amplification.

The output signal of the third amplifier 22 is applied to the modulator 23 to be transferred to the RF frequency of the gyro and then amplified at fourth amplifier 24.

Test voltage detection and monitor 25 receives a voltage of the output of third amplifier 24 to determine whether excessive performance deviations occur in the components of FTR feedback path 20 and RFS path 2. Specifically, test voltage monitor 25 may comprise a demodulator and bandpass filter configured to extract a signal at the f_chp frequency corresponding to the injected tone signal from the output signal of fourth amplifier 24. Test voltage monitor 25 may further include a comparator to compare the amplitude of a voltage of the extracted component at f_chp with an expected range that is determined based on the gains of the components in FTR feedback path 20 and RFS path 2.

Once an excessive deviation out of the expected range for FTR feedback path 20 is detected, test voltage monitor 25 outputs an FTR SM flag alert ("FTR SM flag ON") to the electronic system 40 that is coupled with gyroscope sensor circuit 100. Otherwise, the FTR SM flag maintains off ("FTR SM flag OFF").

By detecting the FTR SM flag ON, the electronic system 40 can diagnose that one or more components in the RFS path 2 and/or FTR feedback path 20 function abnormally. When detecting the FTR SM flag OFF, the electronic system 40 determines that all components in the RFS path 2 and FTR feedback path 20 function in normal.

The RF sensing path 20 may be branched off to QCL path 30 for monitoring a quadrature signal. QCL path 30 may include phase shifter 32, second demodulator 33, fifth amplifier 34, second ADC 35, and second DSP 36. Second demodulator 33 may be a quadrature demodulator (Q-demodulator).

The demodulated combined signal at the output of the second demodulator 33 is phase-shifted at phase shifter 32 such that the phase difference between the combination signal and an LO signal supplied from LO signal input 8 is set to be 90 degrees.

The output of second demodulator 33 is amplified at fifth amplifier 34 and is then digitized by ADC 35. Subsequently, the digitized signals are supplied to second DSP 35 to extract different signals to be analyzed.

In this embodiment, second DSP 36 includes lowpass filter 36a to extract a DC component from the digitalized signal as a quadrature signal indicating an amount of misalignment of the gyro. When there is no misalignment, the phase-shifted RF signal will be canceled off with the LO signal during the multiplying operation at second demodulator 33; thus, lowpass filter 36a generates no quadrature signal.

Second DSP 36 further includes bandpass filter 36a to extract signals of the chopping frequency f_chp, and digital comparator 36b to compare the amplitude of the extracted signal with a target range that is determined based on the gains of the components in RFS path 2 and QCL path 30 and the amplitude of the inserted tone. Thus, digital comparator 36c can continuously monitor the components of RFS path 2 and QCL path 30 to determine if their performance deviates from their target range determined for QCL path 30. Then, digital comparator 36c outputs a QCL SM flag alert signal ("QCL SM flag On") when the amplitude of the extracted signal deviates out of the target range for QCL path 30; otherwise, the QCL SM flag maintains off ("QCL SM flag Off").

The following descriptions are the diagnosis methods to identify abnormal components for the single tone safety mechanism architecture according to embodiments of the present disclosure.

When at least one SM flag turns off and the remaining SM flags turn on, the electronic system 40 can determine that RFS path 2 operates normally because it is the common path, and a non-common path with an SM flag Off functions normally, and a non-common path with an SM flag On functions abnormally. Table 1 lists possible combinations of faults in the gyroscope electronic circuit.

TABLE 1

| SBB SM flag | QCL SM flag | FTR SM flag | Fault |
|---|---|---|---|
| Off | Off | Off | No faults are detected |
| On | Off | Off | RFS path 2, FTR path 20 and QCL path 30 function normally; and one or more components of SBB path 10 are in malfunction. |
| Off | On | Off | RFS path 2, SBB path 10, and FTR path 20 function normally; and one or more components of QCL path 30 are in malfunction. |
| Off | Off | On | RFS path 2, SBB path 10, and QCL path 30 function normally; and one or more components of FTR path 20 are in malfunction. |
| On | On | On | One or more components of RFS path 2, SBB path 10, FTR path 20 and QCL path 30 are in malfunction. |
| Off | On | On | RFS path 2 and SBB path 10 function normally; and one or more components of each FTR path 20 and QCL path 30 are in malfunction. |
| On | On | Off | RFS path 2 and FTR path 20 function normally; and one or more components of each SBB path 10 and QCL path 30 are in malfunction. |
| On | Off | On | RFS path 2 and QCL path 30 function normally; and one or more components of each SBB path 10 and FTR path 20 are in malfunction. |

As shown in Table 1, all of SBB SM flag, QCL SM flag and FTR SM flag are off, then the electronic system 40 determines that all components in RFS path 2, SBB path 10, FTR path 20 and QCL path 30 function normally.

If SBB SM flag is On, QCL flag Off and FTR SM flag Off, the electronic system 40 determines that the components of RFS path 2 (a common path) are operating normally, and the components of FTR feedback path 20 are operating normally, and the components of QCL path 30 function normally, and one or more of the components of SBB path 10 are in malfunction.

If SBB SM flag is Off, QCL SM flag On and FTR SM flag Off, the electronic system 40 determines that RFS path 2, SBB path 10, and FTR path 20 function normally; and one or more components of QCL path 30 are in malfunction.

If SBB SM flag is Off, QCL SM flag Off and FTR SM flag On, the electronic system 40 determines that RFS path 2, SBB path 10, and QCL path 30 function normally; and one or more components of FTR path 20 are in malfunction.

If SBB SM flag is On, QCL SM flag On and FTR SM flag On, the electronic system 40 determines that RFS path 2, SBB path 10, FTR path 20 and QCL path 30 are in malfunction. Thus, one or more components of each of RFS path 2, SBB path 10, FTR path 20 and QCL path 30 function abnormally.

If the FTR SM flag is Off, the SBB SM flag On, and QCL flag On, the electronic system 40 determines that the components of RFS path 2 and FTR path 20 operate normally; and one or more of the components of SBB path 20 are in malfunction, and one or more of the components of QCL path 30 are in malfunction.

If SBB SM flag is On, QCL flag On and FTR SM flag Off, the electronic system 40 determines that RFS path 2 and FTR path 20 function normally; and one or more components of SBB path 10 are in malfunction, and one or more components of QCL path 30 are in malfunction.

If the FTR SM flag is On, the SBB SM flag Off, and QCL flag On, the electronic system 40 determines that the RFS path 2 and SBB path 10 operate normally; and one or more of the components of FTR path 20 are in malfunction, and one or more of the components of QCL path 30 are in malfunction.

FIG. 2 illustrates an example of a method for monitoring the components in SBB path 10, FTR feedback path 20, QCL path 30 and identifying the components of which path functions abnormally.

The method comprises chopping a tone signal at a chopping frequency and inserting a chopped tone signal to RFS path 2 to produce a combined RF sensing and tone signal, in step S10.

In step 20, the method comprises extracting, by first DSP 13, a signal at the chopping frequency, comparing the amplitude of the extracted signal with a target range that is determined based on gains of components in sense base band path 10 and the RFS path 2 and an amplitude of the inserted tone signal, and turning on SBB SM flag when the amplitude of the extracted signal deviates from the target range determined for drive path 10.

In step 30, the method comprises extracting the amplitude of the test signal at f_res±f_chp from the FTR feedback signal, comparing a voltage of the extracted component with a target range determined based on gains of elements of FTR feedback path 20 and RFS path 2, and turning on the FTR SM flag when the amplitude of the extracted signal deviates out of the target range determined for FTR feedback path 20.

In step 40, the method comprises extracting, by second DSP 36, a signal at chopping frequency from a digitalized signal in QCL path 30, comparing an amplitude of the extracted signal with a target range that is determined based on gains of components in the QCL path and the RFS path and the amplitude of the inserted tone signal, and turning on a QCL SM flag when the amplitude of the extracted signal deviates out of the target range determined for QCL path 30.

In step 50, when at least one SM flag turns off and the other SM flags turn on, the method determines that components of the RFS path functions normally, and components of a path with an SM flag off, among SBB path, FTR feedback path, and QCL path, are determined to function normally, and components of a path with an SM flag on are determined to function abnormally. The specific methods of identifying which components are in malfunction are described in Table 1.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A gyro sensor circuit, comprising:
   a gyro sensor generating a radio frequency (RF) sensing signal according to an angular movement of the gyro sensor; and
   an RF sensing path comprising:
      a first chopper comprising a chopping switch, and configured to chop a tone signal at a chopping frequency (f_chp) to generate a chopped tone signal;
      an adder configured to insert the chopped tone signal to the RF sensing signal to produce a combined RF sensing and tone signal; and
      a first demodulator configured to mix the combined RF sensing and tone signal with a local oscillator (LO) signal to output a demodulated signal.

2. The gyro sensor circuit according to claim 1, wherein the tone signal is the LO signal.

3. The gyro sensor circuit according to claim 1, further comprising:
   a sense base band (SBB) path comprising:
      a first analog-to-digital converter (ADC) configured to sample the demodulated signal to output a digitized signal; and
      a first digital signal processor (DSP) to:
         extract a signal at chopping frequency from the digitalized signal,
         compare an amplitude of the extracted signal with a target range that is determined based on gains of components in the SBB path and the RF sensing path and an amplitude of the inserted tone signal, and
         turn on an SBB safety measure (SM) flag when the amplitude of the extracted signal deviates from the target range determined for the drive path.

4. The gyro sensor circuit according to claim 3, wherein the SBB path further comprises a second amplifier configured to amplify the demodulated signal.

5. The gyro sensor circuit according to claim 3, wherein the first DSP comprises:
   a rate extraction circuit configured to extract a rate signal of the gyro sensor from the digitalized signal, the rate signal indicating an angular velocity measured by the gyro sensor.

6. The gyro sensor circuit according to claim 3, further comprising a feedback path configured to feed back a portion of the demodulated signal to the gyro sensor as a feedback signal, the feedback path comprising:
   a third amplifier configured to amplify the first chopped feedback signal to produce a first amplified feedback signal;
   a modulator to upconvert the feedback signal to the gyro sensor resonant frequency; and
   a test voltage monitor configured to:
      extract a test signal from the feedback signal,
      compare a voltage of the extracted component with a target range determined based on gains of elements of the feedback path and RF sensing path, and
      turn on a FTR safety measure (SM) flag when the amplitude of the extracted signal deviates out of the target range determined for the feedback path.

7. The gyro sensor circuit according to claim 6, wherein the test voltage monitor comprises a demodulator and band-pass filter configured to extract the signal component at the chopping frequency (f_chp) corresponding to the injected tone signal.

8. The gyro sensor circuit according to claim 6, further comprising a quadrature cancellation loop (QCL) path for detecting an error in the QCL path comprising:
- a phase shifter configured to shift a phase of the demodulated signal to produce a shifted signal;
- a second demodulator configured to mix the shifted signal with an LO signal supplied from LO signal input to generate a second demodulated signal,
- a second ADC configured to digitize the amplified signal to produce a second digitalized signal;
- a second DSP comprising:
    - a low pass filter configured to extract a DC component from the second digitalized signal as a quadrature signal indicating an amount of misalignment occurred in the gyro;
    - a bandpass filter configured to extract the signal component at chopping frequency (f_chp) corresponding to the injected tone signal, indicating an error in the QCL path; and
    - a processor configured to:
        - compare the amplitude of the extracted signal with a target range that is determined based on gains of components in RF sensing path and QCL path; and
        - turn on a QCL SM flag when the amplitude of the extracted signal deviates out of the target range determined for the QCL path; otherwise, turn off the QCL SM flag.

9. The gyro sensor circuit according to claim 8, wherein the phase of the demodulated signal is shifted such that a phase difference between the demodulated signal and the LO signal is 90 degrees.

10. The gyro sensor circuit according to claim 8, wherein the second DSP comprises:
- a lowpass filter configured to extract the DC component from the second digitalized signal as a quadrature signal indicating an amount of gyro sensor misalignment.

11. An electronic system coupled with the gyro sensor circuit according to claim 8,
- wherein the electronic system is configured to, when at least one SM flag turns off and remaining SM flags turn on, determine that components of the RF sensing path operate normally, and components of a non-common path with an SM flag off functions normally, and components of a non-common path with an SM flag on functions abnormally.

12. The electronic system according to claim 11, wherein when the FTR SM flag is off, the SBB SM flag on, and QCL flag off, the electronic system is configured to determine that the components of RF sensing path are operating normally, and the components of FTR feedback path are operating normally, and one or more of the components of SBB path are in malfunction, and the components of QCL path function normally.

13. The electronic system according to claim 11, wherein when the FTR SM flag is off, the SBB SM flag on, and QCL flag on, the electronic system is configured to determine that either one or more components of RF sensing path are in malfunction or and one or more of the components of SBB path as well as one or more of the components of QCL path are in malfunction.

14. The electronic system according to claim 11, wherein when the FTR SM flag is off, the SBB SM flag off, and QCL flag on, the electronic system is configured to determine that the components of RF sensing path operate normally, and the components of SBB path operate normally, and only one or more of the components of QCL path are in malfunction.

15. An electronic system coupled with the gyro sensor circuit according to claim 8,
- wherein the electronic system is configured to, when at least one SM flag turns on and remaining SM flags turn off, determine that components of the RF sensing path operate normally, and components of a non-common path with an SM flag off functions normally, and components of a non-common path with an SM flag on functions abnormally.

16. A method for operating a gyro sensor circuit comprising a gyro sensor generating a radio frequency (RF) sensing signal according to an angular movement of the gyro sensor, and an RF sensing path configured to process the RF sensing signal, the method comprising:
- chopping a tone signal at a chopping frequency (f_chp) to generate a chopped tone signal;
- inserting the chopped tone signal to the RF sensing path to produce a combined RF sensing and tone signal;
- a demodulator coupled with a local oscillator (LO) generating a LO signal; and
- demodulating the combined RF sensing and tone signal with a local oscillator (LO) signal to output a demodulated signal.

17. The method according to claim 16, wherein the gyro sensor circuit comprises a sensing base band (SBB) path for processing the RF sensing signal, the method further comprising:
- sampling, by an analog-to-digital converter (ADC), the demodulated signal to output a digitized signal;
- extracting, by a digital signal processor (DSP), a signal at chopping frequency from the digitalized signal,
- comparing an amplitude of the extracted signal with a target range that is determined based on gains of components in the drive path and the RF sensing path and an amplitude of the inserted tone signal, and
- turning on a SBB SM flag when the amplitude of the extracted signal deviates out of the target range determined for the SBB path.

18. The method according to claim 17, further comprising:
- shifting a phase of the demodulated signal to produce a shifted signal;
- mixing the shifted signal with an LO signal supplied from LO signal input to generate a second demodulated signal,
- amplifying the second demodulated signa and digitizing the amplified signal to produce a digitalized signal;
- extracting a DC component from the digitalized signal as a quadrature signal indicating an amount misalignment of the gyro sensor;
- extracting a signal component at the chopping frequency (f_chp) from the digitized signal and comparing the amplitude of the extracted signal with a target range that is determined based on gains of components in RF sensing path and QCL path; and
- turning on a QCL SM flag when the amplitude of the extracted signal deviates out of the target range determined for the QCL path; otherwise, turn off the QCL SM flag.

19. The method according to claim 16, wherein the gyro sensor circuit comprises a feedback path for feeding back a portion of demodulated signal toward the gyro sensor as a feedback signal, the method further comprising:
- amplifying the first demodulated signal to produce a first amplified feedback signal;

mixing the first amplified feedback signal with an LO signal to upconvert the feedback signal to the gyro sensor resonant frequency; and extracting the signal component at the chopping frequency (f_chp) from the modulated feedback signal, comparing a voltage of the extracted component with a target range determined based on gains of elements of the feedback path and RF sensing path, and turning on an SBB SM flag when the amplitude of the extracted signal deviates out of the target range determined for the feedback path.

20. The method according to claim 19, further comprising:

when at least one SM flag turns on and the other SM flags turn off, determining that the RF sensing path functions normally, and components of a path with an SM flag off, among the SBB path, FTR feedback path, and QCL path, function normally, and at least one component of a path with an SM flag on functions abnormally.

* * * * *